US012610015B2

(12) United States Patent
Sato

(10) Patent No.: US 12,610,015 B2
(45) Date of Patent: Apr. 21, 2026

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Hideki Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 688 days.

(21) Appl. No.: 17/862,383

(22) Filed: Jul. 11, 2022

(65) Prior Publication Data

US 2023/0291845 A1 Sep. 14, 2023

(30) Foreign Application Priority Data

Mar. 14, 2022 (JP) ................................. 2022-038948

(51) Int. Cl.
*G06F 3/16* (2006.01)
*H04N 1/00* (2006.01)

(52) U.S. Cl.
CPC .......... *H04N 1/00076* (2013.01); *G06F 3/16* (2013.01); *H04N 1/00029* (2013.01); *H04N 1/00408* (2013.01); *H04N 1/00063* (2013.01)

(58) Field of Classification Search
None
See application file for complete search history.

(56) References Cited

U.S. PATENT DOCUMENTS

| | | | | |
|---|---|---|---|---|
| 2008/0144846 A1* | 6/2008 | Sollenberger | .......... | H04R 29/00 381/58 |
| 2014/0292308 A1* | 10/2014 | Gether | ................. | H04R 29/004 324/133 |
| 2016/0267923 A1* | 9/2016 | Goto | ..................... | H04M 3/568 |
| 2018/0345556 A1* | 12/2018 | Nishimura | .......... | B29C 45/5008 |
| 2019/0149916 A1* | 5/2019 | Takayama | .............. | H04R 29/00 381/26 |
| 2021/0377682 A1* | 12/2021 | Rusconi Clerici Beltrami | .......... | H04R 29/005 |

FOREIGN PATENT DOCUMENTS

| | | | | |
|---|---|---|---|---|
| CN | 113259832 | * | 8/2021 | ............ H04R 29/00 |
| JP | 2008043560 | * | 2/2008 | ............... A63F 7/02 |
| JP | 2015094620 | * | 5/2015 | .............. G01H 3/00 |
| JP | 2017133885 | * | 8/2017 | .............. G01H 3/00 |
| JP | 2021131369 | * | 9/2021 | ............ G01H 11/08 |
| KR | 20050011919 | * | 1/2005 | ............ G01M 17/00 |

* cited by examiner

*Primary Examiner* — Beniyam Menberu
(74) *Attorney, Agent, or Firm* — JCIPRNET

(57) ABSTRACT

An information processing apparatus includes a processor configured to operate a predetermined part included in a device after a sound collecting section is installed to the device and before the device is operated in a test mode of the sound collecting section, the sound collecting section being used for specifying an abnormal spot of the device from an operating sound of the device; acquire signal data output from the sound collecting section when the predetermined part is operating; and display a diagnosis result indicating malfunction of the sound collecting section in a case where the signal data does not match reference data which is set in advance and is output from the sound collecting section when the sound collecting section is correctly fixed at a predetermined position of the device.

6 Claims, 3 Drawing Sheets

FIG. 5

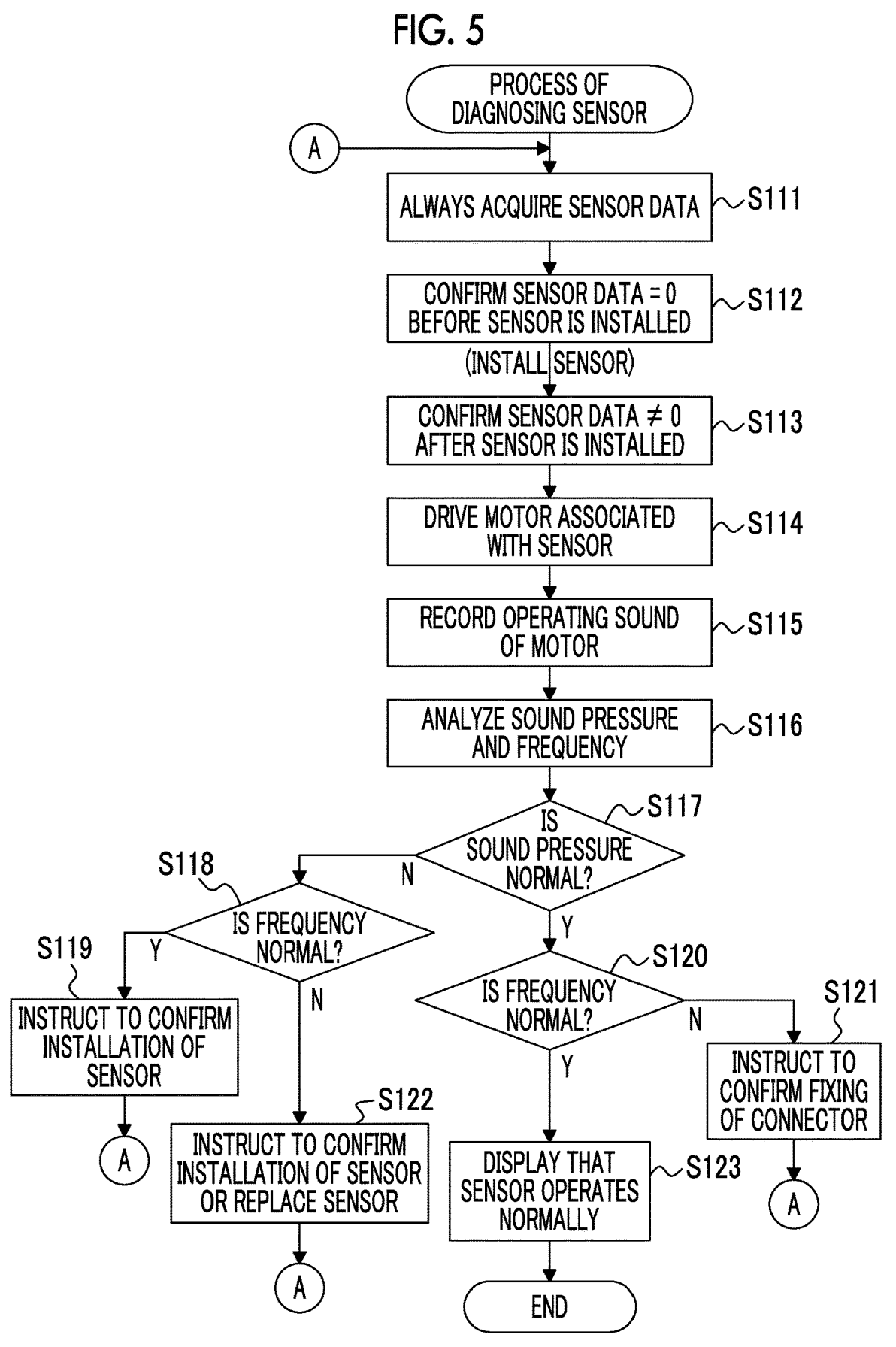

```
                    ┌─────────────────────┐
                    │    PROCESS OF       │
                    │ DIAGNOSING SENSOR   │
                    └─────────────────────┘
        (A)                    │
         │                     ▼
         │         ┌─────────────────────────┐
         └────────►│ ALWAYS ACQUIRE SENSOR DATA │ ∼S111
                   └─────────────────────────┘
                              │
                              ▼
                   ┌─────────────────────────┐
                   │ CONFIRM SENSOR DATA = 0  │ ∼S112
                   │ BEFORE SENSOR IS INSTALLED │
                   └─────────────────────────┘
                      (INSTALL SENSOR)
                              │
                              ▼
                   ┌─────────────────────────┐
                   │ CONFIRM SENSOR DATA ≠ 0  │ ∼S113
                   │ AFTER SENSOR IS INSTALLED │
                   └─────────────────────────┘
                              │
                              ▼
                   ┌─────────────────────────┐
                   │   DRIVE MOTOR ASSOCIATED │ ∼S114
                   │      WITH SENSOR         │
                   └─────────────────────────┘
                              │
                              ▼
                   ┌─────────────────────────┐
                   │  RECORD OPERATING SOUND  │ ∼S115
                   │      OF MOTOR            │
                   └─────────────────────────┘
                              │
                              ▼
                   ┌─────────────────────────┐
                   │  ANALYZE SOUND PRESSURE  │ ∼S116
                   │     AND FREQUENCY        │
                   └─────────────────────────┘
                              │
                              ▼
```

S117 — IS SOUND PRESSURE NORMAL?

S118 — IS FREQUENCY NORMAL? (N from S117)

S119 — INSTRUCT TO CONFIRM INSTALLATION OF SENSOR (Y from S118) → (A)

S122 — INSTRUCT TO CONFIRM INSTALLATION OF SENSOR OR REPLACE SENSOR (N from S118) → (A)

S120 — IS FREQUENCY NORMAL? (Y from S117)

S123 — DISPLAY THAT SENSOR OPERATES NORMALLY (Y from S120) → END

S121 — INSTRUCT TO CONFIRM FIXING OF CONNECTOR (N from S120) → (A)

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2022-038948 filed Mar. 14, 2022.

BACKGROUND

(i) Technical Field

The present invention relates to an information processing apparatus, a non-transitory computer readable medium storing a program, and an information processing method.

(ii) Related Art

For example, as one of the methods for detecting an abnormality in a device such as a multifunction device, there is a method using a sound collecting section such as a microphone. Specifically, the abnormality is detected by attaching the sound collecting section to the inside of the device, collecting the sound inside the device, and analyzing the sound. It is possible to specify an abnormal spot by deciding a position to which the sound collecting section is attached in advance.

By the way, in a case where a customer uses the device in a state in which the sound collecting section is being attached, it is difficult for the customer to be accepted because of the risk of eavesdropping. Therefore, there is a case where the sound collecting section is removable so as to be attached only in case of necessity.

SUMMARY

It is assumed that an abnormality of a device is detected by analyzing sound collected by a sound collecting section. In this case, a case may be also assumed where the removable sound collecting section is not installed well at a predetermined position actually, rather than the abnormality of the device. That is, there is a possibility that normal sound is misunderstood as abnormal sound due to improper installation of the sound collecting section. Therefore, for example, it is preferable to be able to diagnose whether or not the sound collecting section is installed even before the start of use of the device.

Aspects of non-limiting embodiments of the present disclosure relate to an information processing apparatus, non-transitory computer readable medium storing a program, and an information processing method that a sound collecting section that is used in a case where an abnormal spot is specified from an operating sound of a device is diagnosed in a test performed after the sound collecting section is installed to the device and before the device is operated.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus includes a processor configured to operate a predetermined part included in a device after a sound collecting section is installed to the device and before the device is operated in a test mode of the sound collecting section, the sound collecting section being used for specifying an abnormal spot of the device from an operating sound of the device; acquire signal data output from the sound collecting section when the predetermined part is operating; and display a diagnosis result indicating malfunction of the sound collecting section in a case where the signal data does not match reference data which is set in advance and is output from the sound collecting section when the sound collecting section is correctly fixed at a predetermined position of the device.

BRIEF DESCRIPTION OF THE DRAWINGS

Exemplary embodiment(s) of the present invention will be described in detail based on the following figures, wherein:

FIG. 5 is a flowchart showing a sensor diagnosis process according to the present exemplary embodiment.

DETAILED DESCRIPTION

Hereinafter, an exemplary embodiment of the present invention will be described with reference to the drawings.

Figure 1:
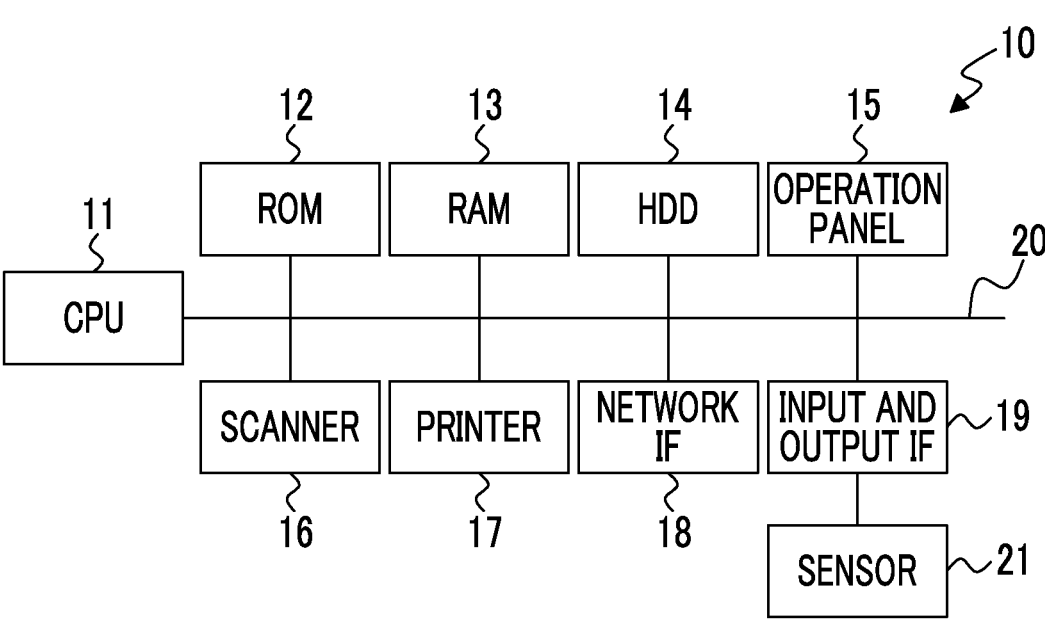
FIG. 1 is a diagram showing an example of a hardware configuration of an information processing apparatus according to the present exemplary embodiment.

FIG. 1 is a diagram showing an example of a hardware configuration of a multifunction device according to the present exemplary embodiment. In the present exemplary embodiment, the multifunction device mounted with a plurality of functions as a device will be described as an example.

The multifunction device 10 is an image forming apparatus mounted with various functions, such as a printing function, a copying function, and a scanner function, and is an apparatus having a built-in computer which is an information processing apparatus. In FIG. 1, a ROM 12 stores various programs related to control of the present apparatus, encryption of electronic data, and transmission and reception of the electronic data, and a CPU 11 controls operations of various mechanisms, such as a scanner 16 and a printer 17, mounted on the present apparatus according to the programs stored in the ROM 12. A RAM 13 is used for a program to be executed, a work memory in a case of execution of the program, and the like. A Hard Disk Drive (HDD) 14 stores an electronic document or the like scanned by using the scanner 16. An operation panel 15 accepts an instruction from a user and displays information. The scanner 16 scans the document set by the user, and accumulates the document as the electronic data in the HDD 14 or the like. The printer 17 prints an image on output paper according to the instruction from a control program executed by the CPU 11. A network interface (IF) 18 is connected to a network, and is used to exchange data with an external device or access the present apparatus via a browser. An input and output interface (IF) 19 is used to connect an input device or an output device. An address data bus 20 is connected to various mechanisms to be controlled by the CPU 11 and performs communication of data.

According to the present exemplary embodiment, a sensor 21 is connected to the input and output interface 19. The sensor 21 is a sound collecting section that collects sound, and, in the present exemplary embodiment, a microphone is used as the sound collecting section. The connection relationship between the input and output interface 19 and the sensor 21 will be described later. The sensor 21 converts the sound into an electrical signal. The data obtained through the conversion is input to the multifunction device 10 via the input and output interface 19, and is analyzed in a case where the sensor 21 is diagnosed.

Figure 2:
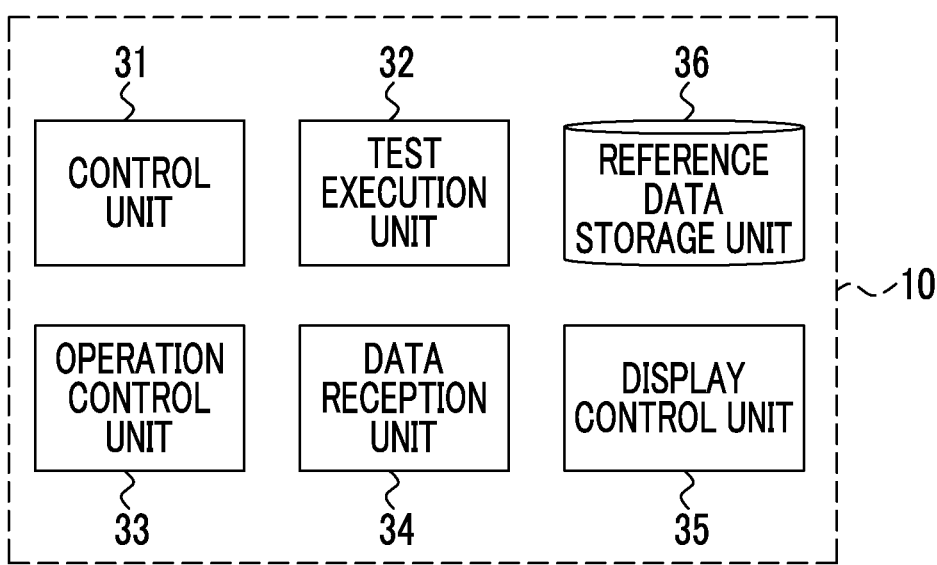
FIG. 2 is a diagram showing an example of a block configuration of a multifunction device according to the present exemplary embodiment.

FIG. 2 is a diagram showing an example of a block configuration of the multifunction device 10 according to the present exemplary embodiment. The multifunction device 10 has a control unit 31, a test execution unit 32, an operation control unit 33, a data reception unit 34, a display control unit 35, and a storage unit 36. Components not used for the description of the present exemplary embodiment are omitted from the drawings.

The control unit 31 controls the entirety of the multifunction device 10 in cooperation with other components. The test execution unit 32 exhibits a function by a test program whose execution is started when a test mode is selected. The test execution unit 32 diagnoses the sensor 21 by executing a diagnostic test. The operation control unit 33 controls an operation of a predetermined part mounted on the multifunction device 10. For example, a motor operated in the test according to the present exemplary embodiment corresponds to a predetermined part. The data reception unit 34 receives signal data (hereinafter, "sensor data") output from the sensor 21. The display control unit 35 controls display on the operation panel 15.

In the present exemplary embodiment, whether or not the sensor 21 operates correctly is diagnosed in the test mode. In order for the sensor 21 to operate correctly, it is necessary that the sensor 21 is correctly fixed at a predetermined position of the multifunction device 10. Therefore, in the test mode, diagnosis is performed to confirm this point. Therefore, the signal data output from the sensor 21 in a case where the sensor 21 is correctly fixed at the predetermined position of the multifunction device 10 is prepared in advance as reference data. In a case of the present exemplary embodiment, the reference data is generated by causing the sensor 21 to collect sound generated by driving the part of the multifunction device 10, that is, the motor, and based on the sound obtained in a case where the sound is collected. In a case where the sensor data, which is acquired by driving the motor in the same manner as in a case of generating the reference data, does not match the reference data in the test mode, it may be determined that the sensor 21 is not correctly fixed at the predetermined position of the multifunction device 10. The storage unit 36 stores the reference data used in the test mode. In the present exemplary embodiment, as the reference data, reference data related to sound pressure and reference data related to a frequency are set in advance.

Each of the components 31 to 35 in the multifunction device 10 is realized by a cooperative operation between the computer mounted on the multifunction device 10 and the program operated by the CPU 11 included in the computer. Further, the storage unit 36 is realized by the HDD 14 mounted on the multifunction device 10. Alternatively, the RAM 13 or an external storage section may be used via the network.

Further, the program used in the present exemplary embodiment can be provided by a communication section and can be provided by being stored in a computer-readable recording medium such as a USB memory. The program provided from the communication section or the recording medium is installed in the computer, and the CPU 11 of the computer sequentially executes the program, thereby realizing various processes.

Next, before describing an operation according to the present exemplary embodiment, the relationship between parts and the sensor 21 in the multifunction device 10 will be described.

Figure 3:
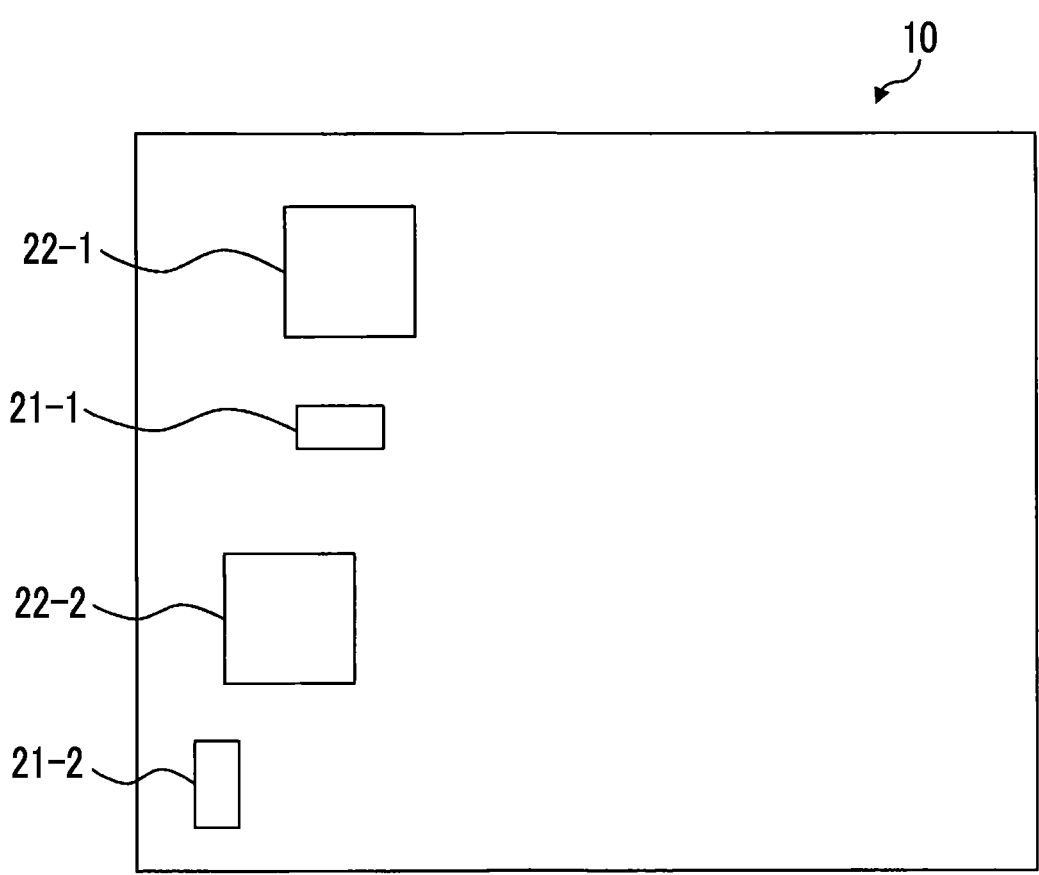
FIG. 3 is an outline diagram shown by extracting only a sensor and a motor attached to the multifunction device according to the present exemplary embodiment.

FIG. 3 is an outline diagram shown by extracting only sensors 21-1 and 21-2 attached to the multifunction device 10 and motors 22-1 and 22-2 as the parts according to the present exemplary embodiment. The sensors 21-1 and 21-2 are collectively referred to as a "sensor 21" in a case where it is not necessary to distinguish the sensors from each other. Similarly, the motors 22-1 and 22-2 are also collectively referred to as a "motor 22".

In a case where the sensor 21 is diagnosed, in the present exemplary embodiment, the motor 22 is driven to generate sound, and the sensor 21 collects the sound. Therefore, the motor 22 that generates the sound for the sensor 21 is associated with the sensor 21 in advance. The association information between the sensor 21 and the motor 22 is stored in the storage unit 36. Specifically, the identification information of the sensor 21 and the identification information of the motor 22 are associated with each other.

Basically, for example, it is preferable to drive the motor 22 closest to the sensor 21. According to FIG. 3, the closest motor 22-1 is associated with the sensor 21-1, and the closest motor 22-2 is associated with the sensor 21-2. Since the position of the motor 22 is determined by the model of the multifunction device 10, the sensor 21 is disposed at an attachable position near the motor 22. Therefore, the correspondence between the sensor 21 and the motor 22 is determined. In the present exemplary embodiment, for convenience of explanation, the sensor 21 and the motor 22 have a one-to-one relationship.

In the present exemplary embodiment, it is not necessary to particularly limit the type of the motor 22. In a case of the multifunction device 10, it is considered that the motor 22 is used for a printing drive decelerator, laser image signal irradiation, cooling, or paper feeding. The motor 22 is disposed at an appropriate position according to the purpose of use. Further, in the present exemplary embodiment, the motor 22 is described as the part of the multifunction device 10, which generates the sound, but as long as a part that generates the sound by driving other than the motor 22, it is not necessary to limit the part to the motor 22.

Figure 4:
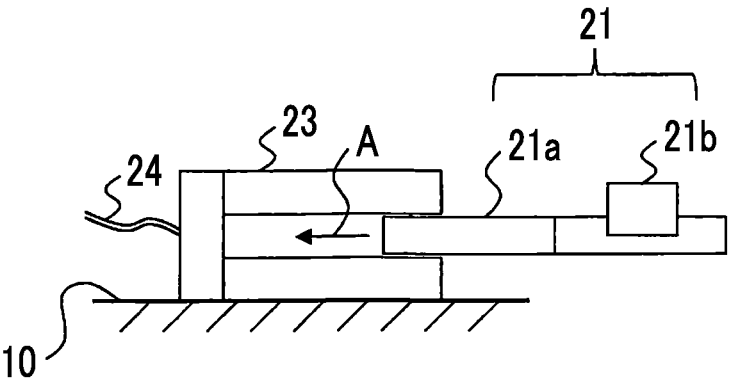
FIG. 4 is a schematic diagram showing a method for attaching the sensor according to the present exemplary embodiment.

FIG. 4 is a schematic diagram showing a method for attaching the sensor 21. FIG. 3 is a plan view and FIG. 4 is a schematic side view obtained in a case where one sensor 21 shown in FIG. 3 is viewed from the side. Of course, the sensor 21 and the motor 22 do not have to be in a horizontal positional relationship inside the multifunction device 10, and may have a vertical or diagonal positional relationship.

According to FIG. 4, the connector (also referred to as an "attachment jig") 23, at which the sensor 21 is installed, is fixed at a predetermined position inside the multifunction device 10. The connector 23 is electrically connected to the input and output interface 19 by a harness (also referred to as "wiring") 24. The sensor 21 has a connection terminal 21a and a microphone 21b. In a broad sense, the sensor 21 and the microphone are positioned as the same sound collecting section, but, in a narrow sense, as shown in FIG. 4, the sensor 21 has the connection terminal 21a installed to the connector 23 and the microphone 21b having a sound collecting function. The user installs the connection terminal 21a to the connector 23 by inserting the sensor 21 in the direction of an arrow A, and electrically connects the microphone 21b to the multifunction device 10.

In the present exemplary embodiment, as described above, the sensor 21 is installed at the predetermined position of the multifunction device 10, that is, a predetermined position to which the connector 23 is attached so that an abnormality generated in the multifunction device 10 can be detected by sound analysis. In a case where a plurality of sensors 21 are attached to the multifunction device 10, it is possible to specify an abnormal spot.

However, in order to enable detection of the abnormal part in the multifunction device 10, it is a prerequisite that the sensor 21 operates normally. That is, whether or not the sensor 21 operates normally requires that the sensor 21 itself operates normally and that the sensor 21 is fixed at a predetermined position. Hereinafter, according to the present exemplary embodiment, a process of diagnosing whether or not the sensor 21 operates normally will be described with reference to a flowchart shown in FIG. 5. Even in a case where the plurality of sensors 21 are attached to the multifunction device 10, a process described below may be repeatedly performed on each of the sensors 21, so here, the description will be given while focusing on one sensor 21.

First, the user starts the multifunction device 10 by turning on the power of the multifunction device 10 in a state where the sensor 21 is not attached. In a case where the multifunction device 10 is started, the user selects the test mode by performing a predetermined operation from the operation panel 15. The control unit 31 controls the multifunction device 10 to operate in the test mode according to the operation of the user. Therefore, it is possible to diagnose the sensor 21.

In a case where the mode shifts to the test mode, a predetermined test program starts execution, and, therefore, the test execution unit 32 starts a process. First, the test execution unit 32 causes the data reception unit 34 to always receive the sensor data output from the sensor 21 (step S111). That is, during the test mode, the sensor data can always be received.

By the way, at the time of starting the test mode, the sensor 21 is not installed to the connector 23, so that no sound is collected. Therefore, originally, a sensor data value should be zero (0), so that the test execution unit 32 first confirms that the sensor data value is zero (step S112). A case where the sensor data value is not zero shows a state in which there is an abnormality between the connector 23 and the input and output interface 19 or the sensor 21 that should not have been installed is installed, so that the test execution unit 32 informs the state to the user by causing the display control unit 35 to display the state on the operation panel 15. As a result, the user takes some action.

Subsequently, the user installs the sensor 21 to the connector 23 attached at the predetermined position. In a case where the sensor 21 is installed to the connector 23, sound collection is started. Therefore, originally, the sensor data value should not be zero (0). The reason for this is that environmental sounds are always present around the multifunction device 10. In a case where a fact that the sensor 21 is installed is detected, the test execution unit 32 confirms that the sensor data value is not zero (step S113). A case where the sensor data value is zero shows a state in which there is an abnormality between the sensor 21 and the input and output interface 19, so the test execution unit 32 causes the display control unit 35 informs the state to the user by causing the display control unit 35 to display the state on the operation panel 15. As a result, the user takes some action.

Subsequently, in a case where the installation of the sensor 21 is confirmed, the test execution unit 32 specifies the motor 22 associated with the confirmed sensor 21 by referring to the storage unit 36, and causes the operation control unit 33 to drive the specified motor 22 (step S114). As a result, the motor 22 starts an operation, but the content of the operation is predetermined, and specifically, the operation content is the same as in a case where the reference data is recorded.

In a case where the plurality of sensors 21 are installed in order to perform a test, the test execution unit 32 can specify the installed sensor 21 by referring to the identification information (for example, a "sensor ID") of the sensor 21 added to the sensor data.

An operating sound of the motor 22 is collected by the sensor 21. The test execution unit 32 records the sensor data output from the sensor 21 by collecting sound in the storage unit 36 (step S115). It is not necessary to particularly limit the recording time or the like as long as it is possible to compare the sensor data recorded for the purpose with the reference data.

Subsequently, the test execution unit 32 acquires the sound pressure and frequency of the sound collected by the sensor 21 by analyzing the recorded sensor data (step S116). Then, the sound pressure obtained from the sensor data (hereinafter, also referred to as "sound pressure measurement value") is compared with the reference data regarding the sound pressure corresponding to the motor 22 associated with the sensor 21, and it is determined whether or not the sound pressure measurement value matches the reference data.

Here, "match" is not limited to a case where the sound pressure measurement value completely matches the reference data, and the allowable range is set for the deviation amount of the sound pressure measurement value from the reference data. As long as the sound pressure measurement value is within the allowable range, it is considered that the sound pressure measurement value matches the reference data. The same applies in a case where the measurement value is a frequency.

In a case where the sound pressure measurement value does not match the reference data (N in step S117), the test execution unit 32 determines that the sound pressure measurement value is an abnormal value. Subsequently, the test execution unit 32 compares the frequency obtained from the sensor data (hereinafter, also referred to as a "frequency measurement value") with the reference data related to the frequency corresponding to the motor 22 associated with the sensor 21, and determines whether or not the frequency measurement value matches the reference data. In a case where the frequency measurement value matches the reference data (Y in step S118), the test execution unit 32 determines that the sound pressure measurement value is a normal value.

In this way, in a case where the sound pressure measurement value is abnormal and the frequency measurement value is normal, it is determined that there is a possibility that the distance between the sensor 21 and the motor 22 associated with the sensor 21 is not correct, that is, the sensor 21 is not correctly installed at the predetermined position. More specifically, it is determined that there is a possibility the connection terminal 21*a* is loosely inserted into the connector 23 and is not firmly installed to the back.

In this case, the test execution unit 32 diagnoses the malfunction of the sensor 21 and displays a diagnosis result indicating the malfunction of the sensor 21. In the present exemplary embodiment, as the diagnosis result, not only the content of notifying the malfunction but also an instruction to eliminate the malfunction, that is, an instruction to correctly install the sensor 21 at the predetermined position is displayed. More specifically, the test execution unit 32 causes the display control unit 35 to display a message for instructing the user to confirm the installation of the sensor 21 on the operation panel 15 (step S119).

On the other hand, in a case where the sound pressure measurement value matches the reference data (Y in step S117), the test execution unit 32 determines that the sound pressure measurement value is a normal value. Subsequently, the test execution unit 32 compares the frequency measurement value obtained from the sensor data with the reference data related to the frequency corresponding to the motor 22 associated with the sensor 21, and determines whether or not the frequency measurement value matches the reference data. Here, in a case where the frequency measurement value does not match the reference data (N in step S120), the test execution unit 32 determines that the frequency measurement value is an abnormal value.

In this way, in a case where the sound pressure measurement value is normal and the frequency measurement value is abnormal, it is determined that there is a possibility that the sensor 21 is vibrating for some reason. For example, although the sensor 21 is correctly installed at the predetermined position, it is determined that there is a possibility that the sensor 21 is vibrating together with the connector 23 because the connector 23 is not firmly fixed to the housing of the multifunction device 10.

In this case, the test execution unit 32 diagnoses the malfunction of the sensor 21 and displays a diagnosis result indicating the malfunction of the sensor 21. In the present exemplary embodiment, as the diagnosis result, not only the content of notifying the malfunction but also an instruction to eliminate the malfunction, that is, an instruction to correctly fix the sensor 21 is displayed. According to the above example, the test execution unit 32 causes the display control unit 35 to display a message for instructing the user to confirm whether or not the connector 23 is fixed to the housing of the multifunction device 10 on the operation panel 15 (step S121).

in a case where neither the sound pressure measurement value nor the frequency measurement value matches each reference data (N in step S117 and N in step S118), the test execution unit 32 determines that both the sound pressure measurement value and the frequency measurement value are abnormal values.

In this case, the test execution unit 32 diagnoses the malfunction of the sensor 21 and displays a diagnosis result indicating the malfunction of the sensor 21. In the present exemplary embodiment, as the diagnosis result, not only the content of notifying the malfunction but also an instruction to eliminate the malfunction, that is, an instruction to correctly install the sensor 21 at the predetermined position and to correctly fix the sensor 21 is displayed. More specifically, the test execution unit 32 causes the display control unit 35 to display a message for instructing the user to confirm the state of the connector 23 and to restart the installment of the sensor 21 from the beginning on the operation panel 15 (step S122).

In a case where the sound pressure measurement value and the frequency measurement value do not match the respective reference data repeatedly even in a case where the user repeatedly responds to the instructions displayed on the operation panel 15, there is a possibility that the sensor 21 itself is out of order. Therefore, the test execution unit 32 may display an instruction to replace the sensor 21 on the operation panel 15. Further, in a case where the sound pressure measurement value and the frequency measurement value do not match the respective reference data even after the sensor 21 is replaced, there is a possibility that the motor 22 has failed and the sound with the same sound pressure and frequency as the reference data is not generated, so that the possibility may be displayed on the operation panel 15.

Further, in a case where both the sound pressure measurement value and the frequency measurement value match the respective reference data (Y in step S117 and Y in step S120), the test execution unit 32 determines that the sensor 21 is normally installed and the connector 23 is fixed to the housing of the multifunction device 10. That is, the sensor 21 is diagnosed as operating normally. In this case, the test execution unit 32 causes the display control unit 35 to display a message that the sensor 21 operates normally on the operation panel 15 (step S123). As a result, the processing of the test execution unit 32 ends, and the control unit 31 ends the test mode.

According to the present exemplary embodiment, as described above, the operation of the sensor 21 may be diagnosed in the test mode executed before the start of use of the multifunction device 10. Then, in a case where the sensor 21 is diagnosed as malfunctioning, an instruction to eliminate the malfunction of the sensor 21 is displayed on the operation panel 15 as the diagnosis result indicating the malfunction. The test mode may be performed in a factory before the multifunction device 10 is newly introduced to a customer's site. In addition, in a case where the customer wants to avoid a state in which the sensor 21 is being installed to the multifunction device 10 because there is a risk of eavesdropping in a case where the sensor 21 is being installed to the multifunction device 10, the customer may install the sensor 21 at the customer's site before starting maintenance and inspection works of the multifunction device 10 of the customer. In this case, a maintenance staff brings the sensor 21 and attaches the sensor 21 to the multifunction device 10 at the customer's site.

In a case where the sensor 21 detects abnormal sound after the operation of the sensor 21 is confirmed, in this case, it can be considered that an abnormality is generated in any part inside the multifunction device 10. In a case where a plurality of sensors 21 are fixed to the multifunction device 10, it is possible to specify a spot where the abnormality is generated.

In the above description, for convenience of explanation, the sensor 21 and the motor 22 have a one-to-one relationship, but a plurality of motors 22 may be associated with one sensor 21. The above-described diagnosis is performed on each of the plurality of motors 22 for one sensor 21, so that a plurality of diagnosis results can be obtained. Therefore, it is possible to improve the accuracy of the diagnosis result for the sensor 21.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
operate a predetermined part included in a device after a sound collecting section is installed to the device and before the device is operated in a test mode of the sound collecting section, the sound collecting section being used for specifying an abnormal spot of the device from an operating sound of the device;
acquire signal data output from the sound collecting section when the predetermined part is operating;
display a diagnosis result indicating malfunction of the sound collecting section due to the sound collecting section not being correctly installed in a case where the signal data does not match reference data, wherein the reference data is set in advance and is output from the sound collecting section when the sound collecting section is correctly fixed at a predetermined position of the device; and
in a case where sound pressure, which is obtained from the signal data, of sound collected by the sound collecting section does not match the reference data related to sound pressure, display an instruction to correctly install the sound collecting section at the predetermined position as the diagnosis result indicating the malfunction.

2. The information processing apparatus according to claim 1, wherein the processor is further configured to:
in a case where sound pressure, which is obtained from the signal data, of sound collected by the sound collecting section does not match the reference data related to the sound pressure and a frequency, which is obtained from the signal data, of the sound collected by the sound collecting section does not match the reference data related to a frequency, display another instruction to replace the sound collecting section as the diagnosis result indicating the malfunction.

3. The information processing apparatus according to claim 2, wherein the processor is configured to:
in a case where the sound pressure and the frequency, which are obtained from the signal data, of the sound collected by the sound collecting section do not match the reference data although the sound collecting section is replaced, display that the predetermined part is abnormal.

4. The information processing apparatus according to claim 1, wherein the processor is further configured to:
in a case where a frequency, which is obtained from the signal data, of sound collected by the sound collecting section does not match the reference data, display another instruction to fix, to the device, an attachment jig of the sound collecting section to the device as the diagnosis result indicating the malfunction.

5. A non-transitory computer readable medium storing a program causing a computer to execute:
operating a predetermined part included in a device after a sound collecting section is installed to the device and before the device is operated in a test mode of the sound collecting section, the sound collecting section being used for specifying an abnormal spot of the device from an operating sound of the device;
acquiring signal data output from the sound collecting section when the predetermined part is operating;
displaying a diagnosis result indicating malfunction of the sound collecting section due to the sound collecting section not being correctly installed in a case where the signal data does not match reference data, wherein the reference data is set in advance and is output from the sound collecting section when the sound collecting section is correctly fixed at a predetermined position of the device; and
in a case where sound pressure, which is obtained from the signal data, of sound collected by the sound collecting section does not match the reference data related to sound pressure, displaying an instruction to correctly install the sound collecting section at the predetermined position as the diagnosis result indicating the malfunction.

6. An information processing method comprising:
operating a predetermined part included in a device after a sound collecting section is installed to the device and before the device is operated in a test mode of the sound collecting section, the sound collecting section being used for specifying an abnormal spot of the device from an operating sound of the device;
acquiring signal data output from the sound collecting section when the predetermined part is operating;
displaying a diagnosis result indicating malfunction of the sound collecting section due to the sound collecting section not being correctly installed in a case where the signal data does not match reference data, wherein the reference data is set in advance and is output from the sound collecting section when the sound collecting section is correctly fixed at a predetermined position of the device; and
in a case where sound pressure, which is obtained from the signal data, of sound collected by the sound collecting section does not match the reference data related to sound pressure, displaying an instruction to correctly install the sound collecting section at the predetermined position as the diagnosis result indicating the malfunction.

* * * * *